Feb. 13, 1945. K. C. TEN BRINK ET AL 2,369,264
WOODEN SPLASH PLATE ASSEMBLY
Filed Nov. 27, 1942 2 Sheets-Sheet 1

K.C. Ten Brink
A.R. Salley
INVENTOR.
BY
J. Vincent Martin
and
Ralph R. Browning
ATTORNEYS Feb. 13, 1945.   K. C. TEN BRINK ET AL   2,369,264
WOODEN SPLASH PLATE ASSEMBLY
Filed Nov. 27, 1942   2 Sheets-Sheet 2
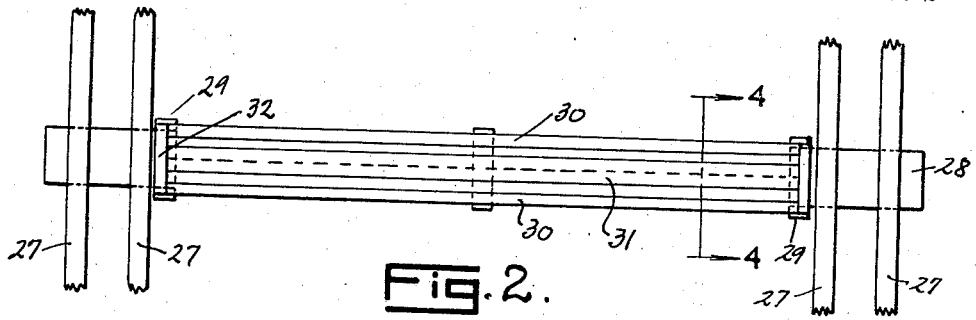
Fig.2.
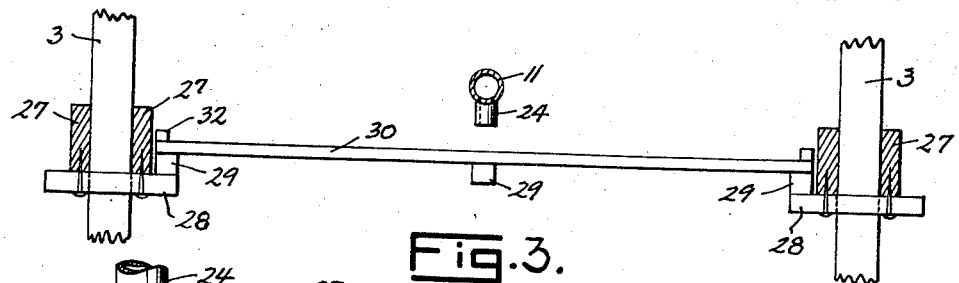
Fig.3.
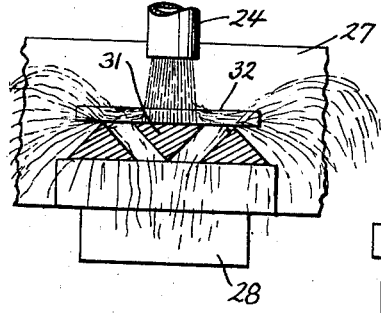
Fig.4.
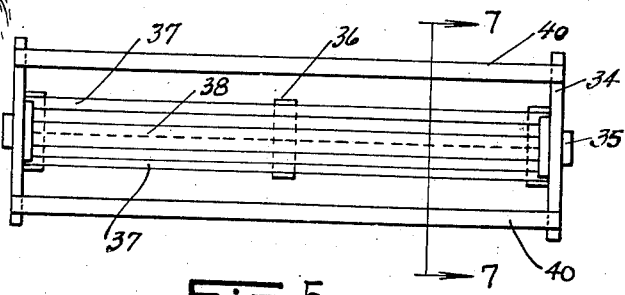
Fig.5.
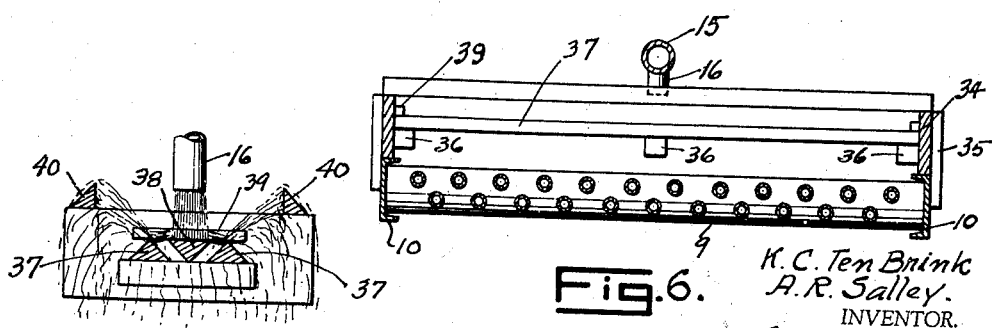
Fig.6.
Fig.7.
K. C. Ten Brink
A. R. Salley.
INVENTOR.
By J. Vincent Martin
and
Ralph R. Browning
ATTORNEYS Patented Feb. 13, 1945

2,369,264

UNITED STATES PATENT OFFICE 2,369,264

WOODEN SPLASH PLATE ASSEMBLY

Karl C. ten Brink and Allen R. Salley, Houston, Tex., assignors to Hudson Engineering Corporation, Houston, Tex., a corporation of Texas Application November 27, 1942, Serial No. 467,118

8 Claims. (Cl. 299—121)

This invention relates to the distribution of liquids and more particularly has reference to a splash plate assembly for spreading and distributing a stream of water in droplets uniformly over a wide area.

An apparatus for cooling water for use in condensers and other cooling equipment in which water is sprayed into a body of air for effecting refrigeration by evaporation or absorption of water vapor in the air may comprise various constructions. One widely used form of such apparatus is the cooling tower which consists in general of an enclosure with some means of spraying the water or other liquid to be cooled down through the enclosure, means inside of the enclosure for interrupting the falling of the liquid, and means for circulating air or some other cooling gas through the enclosure and through the falling liquid. The enclosure may be perforate to allow the air to blow through but prevent the escape of the water spray, or it may be relatively imperforate and provided with mechanical means either at the top or at the bottom of the tower for blowing air or gas through the tower and through the falling water.

Frequently at the bottom of a tower there is provided a means for collecting the water and causing it to flow into a header from which it is again sprayed on to condenser coils or other coils that are to be cooled by the water that has been cooled in passing through the cooling tower.

In the past various types of spray heads or nozzles have been employed for producing the spray at the top of the cooling tower or over the coils as the case may be. Some of these have consisted of plates of various shapes and sizes, sometimes one and sometimes more than one placed in the path of a stream of water directed through a nipple from a header. Various degress of satisfactory or unsatisfactory distribution have been attained by such devices. However, such devices have been expensive because almost invariably they have been made of metal and have been bolted or otherwise secured to the header. Furthermore, they were of such a nature that they would get out of adjustment relatively easily and frequently become clogged by scale or trash that would get into the system, to say nothing of the necessity for cleaning or replacement due to corrosion or marine growths. Added to all this is the fact that metal is at present, of course, a very scarce material and practically unavailable except in locations where the work is in furtherance of the war effort or for a highly essential civilian project.

It is important that the water be sprayed as uniformly as possible into the flowing current of air. In many constructions spray heads or splash devices are provided for distributing droplets of water, which act as the refrigerating medium, into the flowing stream of air. It has been found, however, that the usual spray head or splash device is not as satisfactory for the proper distribution of water as it would seem. Furthermore, when water or another cooling liquid is distributed over heat exchange coils by spraying in the usual manner, it is found that the heat exchange relation between the sprayed medium and the coils is not as great as would be desirable. This is due primarily to the fact that the spray head or splash device distributes the water over a substantially circular area. Obviously, when the water is sprayed from a head or device of this type, it is quite impossible to get a very uniform distribution over a large rectangular area.

An object of this invention is to provide an apparatus for distributing liquids which will avoid the disadvantages of the prior art as hereinbefore pointed out.

Another object of this invention is to provide an apparatus for the distribution of liquids which will serve to break up a stream of liquid and spray the same uniformly over a wide area.

A further object of this invention is to provide a liquid distributing device capable of breaking up a stream of water and spraying the same in droplets uniformly over a wide rectangular area.

Still another object of this invention is to provide an apparatus for the distribution of liquids in a cooling tower.

It is a further object of this invention to provide a liquid distributing device which will break up a solid stream of liquid and uniformly spray the same over a wide area which device is constructed substantially entirely of wood.

A still further object of this invention is to provide a liquid distributing and spraying device of the type herein set forth which is constructed without the use of metal or other military strategic materials.

In addition to the foregoing, the present invention has for an object a method of breaking up a stream of liquid and spraying the same uniformly over a wide area.

With these and other objects in view, the present invention resides in the parts and combinations and the procedure hereinafter set forth and illustrated in the drawings.

In the drawings:

Fig. 2 is a fragmentary view illustrating in plan a liquid distributing device in accordance with the present invention.

Fig. 3 is a fragmentary elevational view of the structure shown in Fig. 2, some parts being shown in section.

Fig. 4 is a sectional view taken on line 4—4 of Fig. 2.

Fig. 5 is another fragmentary plan view of a modified form of a liquid distributing device.

Fig. 6 is a fragmentary elevational view partly in section of the structure shown in Fig. 5.

Fig. 7 is a sectional view taken on line 7—7 of Fig. 5.

Figure 1:
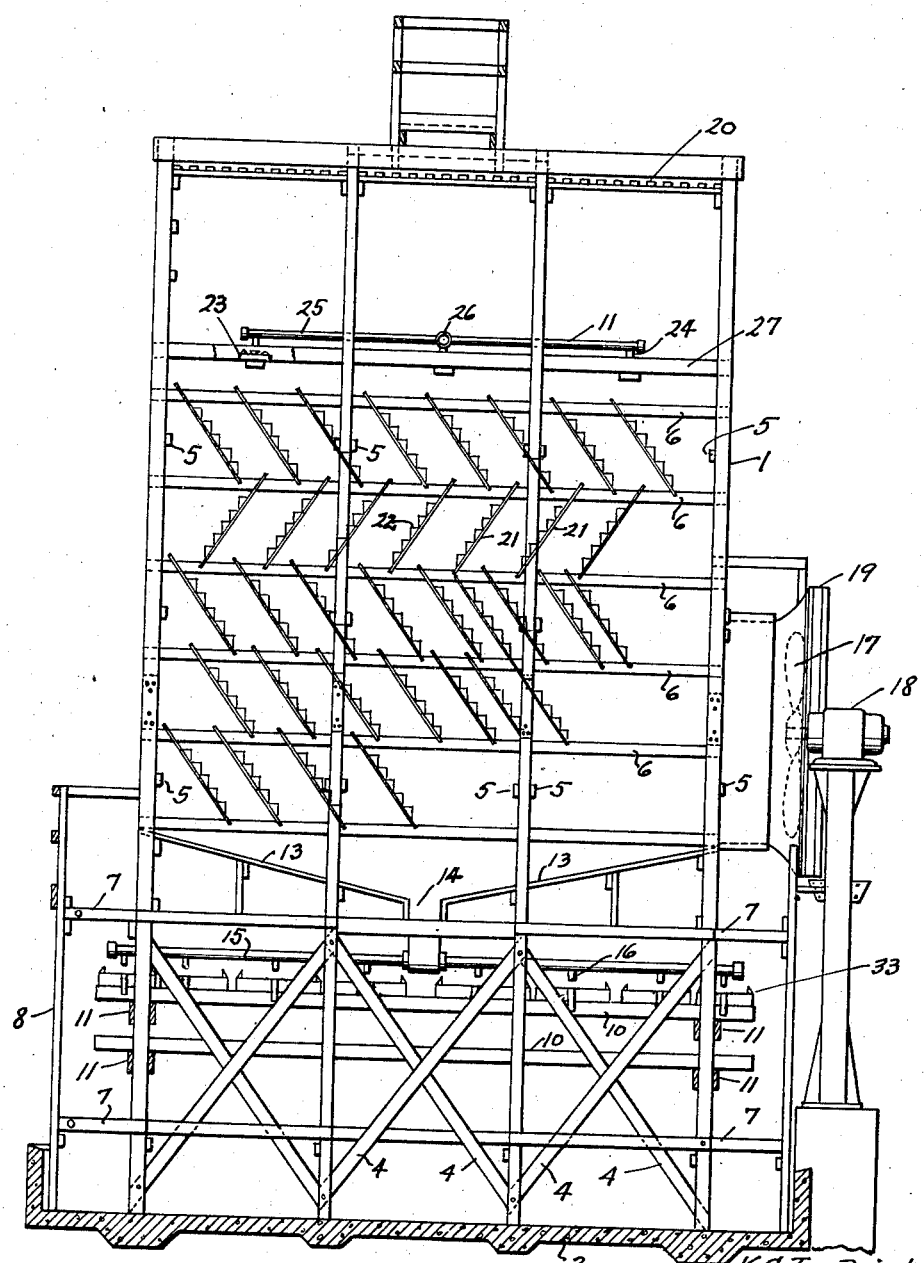
Figure 1 is a vertical sectional view through a cooling tower equipped with liquid distributing devices in accordance with the present invention.

There is shown in the drawings a cooling apparatus in the form of a tower 1. For purposes of illustration, only the framework of the tower has been shown but in actual construction, a covering of sheathing or other suitable material will be applied to form the exterior skin thereof. The base of the cooling tower is supported upon the bottom of a concrete basin 2 which serves as a catch basin for the water which is sprayed downwardly through the tower.

Extending upwardly from the floor of the basin 2 are a plurality of columns 3 which are braced at their lower portions by a plurality of diagonally extending members 4. A plurality of horizontal beams 5 extend longitudinally of the tower and a plurality of horizontal beams 6 extend transversely of the tower.

At the lower portion of the tower the horizontal beams 7 project beyond the outermost columns 3 and are secured to upright members 8 on each side of the tower. The uprights 8 define the outer walls of a coil shed at the lower portion of the tower. Within this shed there are positioned a plurality of coils 9 over which cooling water is sprayed. These coils 9 are supported in channel beams 10 (Fig. 6) which extend horizontally transversely of the tower and bear on beams 11, the latter being secured to the columns 3.

Tower 1 is provided with what may be termed a false bottom in the form of a water collecting box. This box is formed by a floor 13 which inclines from the side walls of the tower toward the central or some other intermediate position so that any liquid which falls on the said floor will flow toward the sump 14 for collection.

Conduits 15 extend laterally from the sides of sump 14 and are provided with a plurality of discharge nozzles 16. The tower may be divided longitudinally thereof into a plurality of sections and each section may be provided with an individual collection box constructed as described.

Immediately above the collection box floor at one side of the tower there is provided one or more fans 17 which may be driven by individual electric motors 18 or other power device. The blades of the fans are positioned for rotation within funnel-like guards 19 which open into the side of the tower and serve to force a stream of air into the portion of the tower 1 above the floor 13. The air introduced into this portion of the tower 1 by fans 17 flows upwardly by reason of the imperforate nature of the skin of the tower and is discharged through the top thereof. For this purpose, the upper portion of the tower is provided with a plurality of spaced slats 20 which also serve as mist breakers.

Intermediate the collection box and the top of the tower, there are provided a plurality of breakers comprising side support bars 21 inclined relative to the vertical and supported by the beams 6, and spaced transverse slats 22, preferably of triangular cross section, carried on the side bars 21. Air introduced into the tower by means of the fan 17 flows upwardly through the tower. The breakers may be staggered and arranged in any desired relation to produce the most effective operation. They serve to provide large surfaces on which the water or other liquid may spread out to facilitate its contact with the rising air.

Positioned above the breakers 21 are a plurality of liquid distributing devices 23 onto which water is deposited from suitable nipples 24 provided in branch conduits 25 extending from header 26.

As shown in the drawings, header 26 is carried on the horizontal header support beams 27 which are secured to the columns 3. Beams 27 also serve to support the liquid distributing device 23. For this purpose a cleat 28 is secured to the underside of each pair of beams 27 and projects beyond said beams to form a ledge on which the end tie strips 29 of the liquid distributing device are mounted.

Supported on and secured to the tie strips a pair of spaced bats or slats 30 of triangular cross section, the base of said bats or slats lying in engagement with the upper surfaces of the tie strips 29. Intermediate the slats 30 is another bat or slat 31 of triangular cross section. This bat or slat 31 is inverted in that the wide base or bottom surface is positioned upwardly and the apex of said strip engages the upper surfaces of the tie strips 29. In order to effectively secure the intermediate bat or slat 31 in position and relation to the other bats 30 a strip 32 is fastened to the upper surface adjacent each end thereof and extends laterally therefrom to rest upon the apices of the adjacent slats 30.

As is more clearly shown in Fig. 4 the assembly of slats 30 and 31 is positioned so that the center slat 31 lies directly under the nozzles or nipples 24. When in this position a solid stream of water from the nozzle or nipple 24 is discharged onto the upper flat horizontal surface of slat or bat 31 and splashed outwardly. The distance between the nipple and slat 31 is not critical and may vary from one inch to several feet, the only limitation being that it be close enough to the nipple so that the stream of water from the nipple will not become a spray before it reaches the splash assembly, and that it be far enough from the nipple so that the splash from the assembly will not be interfered with by the nipple or header. When the stream strikes this central slat of the assembly it spreads in all directions. Part of it runs along the slat towards its opposite ends and builds up a substantial layer of water on the slat, this water gradually running off the sides of the slats all the way to the end of the slat. The water which runs off the sides of the slats breaks up, part of it adhering to the under surfaces of the triangular central slat and running down to drip off the lower edge thereof and part of it dripping off as it goes down with some of it striking the other two slats. This forms a fairly evenly distributed spray directly beneath the central slat and extending throughout its entire length. Most of the water runs laterally off the central slat toward the side slats. This water strikes the side slats just below their upper edges and most of it is deflected outwardly and upwardly and forms a well distributed spray over a wide area.

While the slats 30 and 31 have been described as of triangular cross section, they may be of rectangular cross section. In this instance the center slat would be positioned with its flat surface horizontal and the two side slats would be positioned with their flat surfaces inclined at an angle corresponding to that of the inclined surfaces of the triangular slats. Thus the most important surfaces of the slats are the upper flat surface of the center slat, and the inclined surface of the other two slats which are adjacent the center slat. The inclined surfaces of the two outer slats should extend up to a level about even with the flat horizontal surface of the center slat to produce the desired results.

In assembling the slats they should be spaced to produce the desired results. This can be determined by varying the spacing with slats of a given width or size and after it has been ascertained all other sets of slats can be similarly spaced.

The spray resulting from the splashing of the streams of water from the nipples or nozzles 24 on the splash assemblies 23 falls evenly over the breakers 21 and contacts the air forced upwardly about and between the breakers by the fan 17. Evaporation or absorption of the moisture in the air takes place resulting in the cooling of the unevaporated water. All of the water which is not evaporated is collected in the pan or collection box and is passed into the conduits 15 and discharged therefrom through the nozzles or nipples 16 onto the coils 9.

In order to break up the solid streams of water and evenly distribute the same over the coils, additional splash assemblies 33 are provided.

These splash assemblies are constructed substantially identically to those described and shown in Figs. 2 to 4 of the drawings and are mounted upon the channel beams 10 which support the coils 9. As is best illustrated in Fig. 5 of the drawings the splash assemblies 33 comprise end strips 34 which are adapted to lie upon the upper flange of the channel beams 10. Extending downwardly from each of the strips 4 and overlying the outer web of the channel beam 10 is a guide strip 35. On the inner portion of the end strip 34 there is secured a tie strip 36 which corresponds to the tie strip 29 of the splash assembly illustrated in Figs. 2 to 4.

The coils 9 are located between the pairs of channel beams 10 and the slats of the splash assembly extend between the end strips on the pair of beams 10. For this purpose, the ends of the slats are secured to the tie strips as illustrated in Figs. 5 and 6. In this connection, it will be noted that there is a pair of slats 37 of triangular cross section positioned on the tie strip 36 with the flat base portions lying against said tie strips. Positioned intermediately of said slats 37 is another slat 38 of triangular cross section which is inverted in that the apex thereof lies upon the tie strips 36. The intermediate slat 38 is held in position in the same manner as the intermediate slat 31 of the structure shown in Figures 2 to 4 in that a strip 39 is secured to the upper flat surface of the slat and extends laterally from the sides thereof to lie upon the apices of the outer slats 37.

The splash assemblies 33 are located so that the center slat 38 will lie immediately beneath the nozzles or nipples 16 from which a solid stream of liquid is discharged. The solid stream of liquid discharged from the nozzle 16 will fall upon the upper horizontal flat surface of the center strip 38 and will splash outwardly in the same manner as was described in connection with the structure shown in Figs. 2 to 4.

Since the splash assemblies 33 are to serve to uniformly spray water upon the coils 9, it is obvious that for maximum efficiency the spray should have a rectangular pattern corresponding to the shape of the coil 9. In accordance with the present invention, the stream of water broken up by the splash assembly can be uniformly distributed in a rectangular pattern by the provision of surfaces positioned to intercept a portion of the liquid deflected upwardly by the inclined surfaces of the outer slats 37. For this purpose, a pair of slats 40 are secured upon the upper edges of the end strips 34. Slats 40 are positioned with one surface substantially vertical and lying outwardly of the slats 37 and above the same. By locating the vertical surfaces of the slats 40, as described, the upwardly deflected portion of the splash will be redeflected inwardly toward the center of the assembly and will fall uniformly with the other broken up liquid to produce a uniform pattern of rectangular cross section.

Upon first consideration, it may appear that the location of the slats 40 would tend to concentrate the spray along the straight line boundary provided thereby, but actually this is not the case because although part of the spray drops directly from the slats 40, part of it rebounds so that the spray which would otherwise go to make up the remainder of the circular pattern is fairly well distributed over the rectangular area defined between the slats 40.

By providing the guide strips 35 on the outer surfaces of the end strips 34, the splash assembly 33 is effectively mounted upon the channel beams 10 in a definite relation with respect to the nozzles or nipples 16 which discharge a stream of liquid from the conduit 15.

It will be noted that between the ends of the series of three slats there are provided tie strips 29 and 36. These serve to maintain correct spacing of the slats for the proper distribution of the liquid.

The splash assemblies 23 and 33 operate on the same principle as hereinbefore described.

Each of the splash assemblies of the present invention is made of wood and employs no critical materials except a few nails of noncorrosive material. It will not become clogged with scale or debris of various types, it will not corrode, and marine growths which might possibly form on it will have little or no effect upon its efficiency. Added to this is the fact that it possesses an extremely high degree of efficiency in spreading and evenly distributing water in a spray over a wide area, it requires no critical adjustments, and once in place will not get out of adjustment, and it is very cheap and simple to manufacture.

The sizes of the slats, their spacing relatively to each other and with respect to the nozzles and their length are determined by the sizes of the streams of water to be distributed and the area over which distribution is to be effected.

In constructing the splash assemblies the slats are made of a length corresponding to the length of the area to be sprayed. Of course, the concentration of the spray will depend upon the lengths of the slats and the area to be sprayed. Spacing between the strips is determined by trial and error and after the best results are obtained other assemblies may have their slats spaced correspondingly.

With the slats of the splash assembly assembled as shown best results are obtained. However, the upper edges of the side slats may be slightly varied in level relatively to the upper flat surface of the center slat without serious consequences. The width of the deflecting surfaces of the slats may be of various sizes depending on the quantity of water to be distributed and on the area over which it is distributed. In any event the width of the upper surface of the center strip should be as large as the interior diameter of the nipples or nozzles from which water is discharged onto the slats.

In the splash assembly the upper flat surface of the center slat and the adjacent inclined surfaces of the side slats are the important portions of the slats and so long as these three surfaces are provided in the relation described, the slats may have any geometrical form, the triangular form being merely convenient and economical.

From the foregoing description it will be appreciated that the present invention provides for the uniform distribution of liquid over a wide area in a simple manner with low cost equipment.

While the invention has been shown associated with a water cooling tower of the mechanical draft type, having a coil shed to show the application of splash assemblies 33, it may be used with water towers of the atmospheric or natural draft type and with any other apparatus which requires the breaking up of a solid stream of liquid and the spraying of the same over wide and controlled areas. The methods of mounting shown in Figures 1, 2, 3 and 6 are simply suggested for use in the tower shown as an illustration, but changes in the method of mounting would in no way affect the essential features of this invention.

Having described our invention, we claim:

1. A method of spraying a liquid comprising playing a solid stream of water downwardly onto a substantially horizontal surface and thereby causing the liquid to fan out laterally in opposite directions, intercepting said fanned out portions of said stream and deflecting said portions partly upwardly and laterally away from the original stream and partly downwardly and inwardly beneath said surface, the directions of deflection being such as to effect uniform spraying of the liquid over a given area.

2. A liquid distributing device comprising a member having an elongated substantially horizontal surface, means for playing a stream of liquid downwardly onto said surface, said member having a pair of longitudinal slots each having parallel plane walls extending from the outer longitudinal edges of said surface and converging downwardly to receive portions of liquid splashed laterally from said surface and to direct at least a part thereof downwardly beneath said surface.

3. A liquid distributing device comprising an elongated strip positioned with one of its surfaces substantially horizontal, means for directing a solid stream of a liquid substantially perpendicularly onto said surface, a second elongated strip laterally spaced from one edge of the first mentioned strip and having a surface positioned to receive a portion of the stream splashed from the surface of the first mentioned strip, the surface of the second strip being so inclined relatively to the surface of the first strip as to deflect the portion of the stream received thereby partly upwardly and away from and partly downwardly beneath the first strip, and means positioned above and spaced laterally outwardly of the second strip to receive and redirect the liquid deflected upwardly by the second strip.

4. A liquid distributing device comprising an elongated strip of triangular cross section positioned with one of its surfaces upward and substantially horizontal, means for directing a stream of a liquid substantially perpendicularly onto said surface, a strip of triangular cross section positioned on each side of and laterally spaced from the first mentioned strip with one surface of each strip substantially horizontal and with the opposite apice of each strip substantially at the level of the horizontal surface of the first strip and with inclined surfaces substantially parallel to the inclined surfaces of the first strip.

5. A splash assembly comprising spaced horizontally disposed supports, a pair of strips of triangular cross section mounted in spaced parallel relation on said supports, each with one surface horizontal and bearing on said supports, a third strip of triangular cross section, means for supporting said third strip between the first-mentioned strips in spaced relation thereto with one flat surface horizontal and upward in alignment with the apices of the first-mentioned strips, and means for directing a solid stream of water perpendicularly onto the upper flat surface of the third strip.

6. A liquid distributing device comprising an elongated slat having a flat surface positioned upward and substantially horizontal, means for directing a stream of liquid substantially perpendicularly onto said surface, a pair of spaced strips one positioned on each side of and laterally spaced from the slat, said strips each having a flat surface inclined downwardly and inwardly towards said slat, the strips being so placed relative to the slat that with a given force of discharge of said stream water is deflected from the upward surface of the slat onto said inclined surfaces of said strips.

7. A liquid distributing device comprising a member having a substantially horizontally disposed surface, means for discharging an unbroken stream of liquid downwardly onto said surface and in a direction substantially perpendicularly thereto, a baffle positioned on each side of said member and spaced therefrom, each baffle having a surface extending downwardly from a position level with the surface of said member inwardly towards said member to intercept portions of the transversely directed splash from the surface of said member beneath said member.

8. A liquid distributing device comprising an elongated slat having a flat surface positioned upward and substantially horizontal, means for directing a stream of liquid substantially perpendicularly onto said surface, a pair of spaced strips one positioned on each side of and laterally spaced from the slat, said strips each having a flat surface inclined downwardly and inwardly towards said slat, the strips being so placed relative to the slat that with a given force of discharge of said stream water is deflected from the upward surface of the slat onto said inclined surfaces of said strips, said flat surface having a width as great as the major dimension of the cross section of the stream at the region of impingement thereon.

KARL C. ten BRINK.
ALLEN R. SALLEY.